United States Patent
Harris et al.

(10) Patent No.: US 10,767,938 B2
(45) Date of Patent: Sep. 8, 2020

(54) HEAT EXCHANGER WITH A PLASTIC HEADER PLATE

(71) Applicant: DENSO International America, Inc., Southfield, MI (US)

(72) Inventors: Justin Harris, Royal Oak, MI (US); Daniel Stephens, Ferndale, MI (US); Robert Cardno, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 54 days.

(21) Appl. No.: 16/248,358

(22) Filed: Jan. 15, 2019

(65) Prior Publication Data

US 2020/0224982 A1 Jul. 16, 2020

(51) Int. Cl.
*F28F 9/02* (2006.01)
*F28F 21/06* (2006.01)
*B60H 1/00* (2006.01)

(52) U.S. Cl.
CPC ........... *F28F 9/02* (2013.01); *B60H 1/00328* (2013.01); *F28F 21/062* (2013.01)

(58) Field of Classification Search
CPC ........ F28F 9/02; F28F 21/062; B60H 1/00328
USPC ........................................................ 165/173
See application file for complete search history.

(56) References Cited

U.S. PATENT DOCUMENTS

| | | | |
|---|---|---|---|
| 4,651,815 A * | 3/1987 | Logic | F28F 9/0226 165/148 |
| 4,881,594 A * | 11/1989 | Beamer | F28F 9/0226 165/173 |
| 5,390,519 A * | 2/1995 | Kuroda | B21D 35/00 29/890.052 |
| 5,865,244 A | 2/1999 | Moser | |
| 2001/0027860 A1 * | 10/2001 | Watanabe | F28F 9/0246 165/178 |
| 2008/0121386 A1 * | 5/2008 | Hakamata | B21D 53/02 165/173 |
| 2009/0139703 A1 | 6/2009 | Vet et al. | |
| 2010/0282449 A1 | 11/2010 | Merklein et al. | |
| 2010/0300664 A1 * | 12/2010 | Kang | F28D 1/05383 165/157 |
| 2017/0299288 A1 | 10/2017 | Bry et al. | |

\* cited by examiner

*Primary Examiner* — Davis D Hwu
(74) *Attorney, Agent, or Firm* — Harness, Dickey & Pierce, P.L.C.

(57) ABSTRACT

An automotive heat exchanger (10) has a heat exchanger core (12) including a header part (16) with a plurality of heat transfer tubes (38) and a head tank (20) with an opening receives end portions of the heat transfer tubes (38). A plastic header plate (18) is secured with the header tank (20) and header part (16). The header plate (18) includes a plurality of apertures (24) extending through the plate (18) that enable fluid passage. Each aperture (24) includes a cutout portion (28) that receives an end of a heat transfer tube (38). The cutout portion (28) has a complimentary shape to mate with the end of the heat transfer tube (30). A seal (50), in the cutout portion (28), seals the end of the heat transfer tube (28) with the header plate (18).

9 Claims, 3 Drawing Sheets

HEAT EXCHANGER WITH A PLASTIC HEADER PLATE

FIELD

The present disclosure relates to heat exchangers, such as automobile radiators, and, more particularly, to a plastic header plate positioned inside of the heat exchanger.

BACKGROUND

Standard air to air or liquid heat exchanger core assemblies (radiators, oil coolers, charge air coolers, or the like) include two aluminum/header plates, two inserts (side panels or plates) and a stack of aluminum tubes and fins all braised together. An issue with this design is tube failure occurs due to thermal stress. When vehicles are operated in cold weather, the heat exchanger radiator is subjected to high temperature gradients. Thus, one part of the radiator is very hot, while the other part is cold. This results in high tube stresses. This is due to the core expanding/contracting at different rates. Also, due to the rigidity of the core or header plates, there is little, if any, thermal relief between the tubes.

Different types of designs have been proffered to deal with thermal stress. Some designs add tube stiffeners inside the tube to increase the bending moment of inertia at the tube header joint. Other designs have utilized high strength magnesium tubes to increase the fatigue life of the tube. Additionally, inserts are cut to enable thermal relief at the corner tubes. However, several issues are associated with each of the proffered solutions.

SUMMARY

Accordingly, it is an object of the present disclosure to provide an inexpensive and effective solution to minimize thermal stress.

It is an object of the disclosure to provide an automotive heat exchanger or radiator comprising a heater exchanger core with a header part with a plurality of heat transfer tubes. A header tank, with an opening for receiving the end portions of the heat transfer tubes, is secured with the heat exchanger core. A plastic header plate includes a plurality of apertures extending through the plate. The apertures enable fluid passage. Each aperture includes a cutout portion to receive an end of a heat transfer tube of the plurality of tubes. The cutout portion has a complimentary shape to mate with the end of the heat transfer tube. A seal is provided in the cutout portion to seal the end of the heat transfer tube with the header plate. A plurality of collars are positioned on the ends of the plurality of heat transfer tubes. Each collar has a desired configuration to mate with the corresponding cutout portion. The head of the collar has an overall rectangular shape. Thus, the cutout portion is a slot with an overall T-shape when viewed in side elevation. The seal is on a wall of the header plate defining the T-shape slot. Preferably, the seal is of an EPDM material. The header tank includes a mechanism to couple it with the header plate. The coupling mechanism includes a plurality of latches mating with the cutouts. The plurality of latches include a plurality of hooks and lugs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
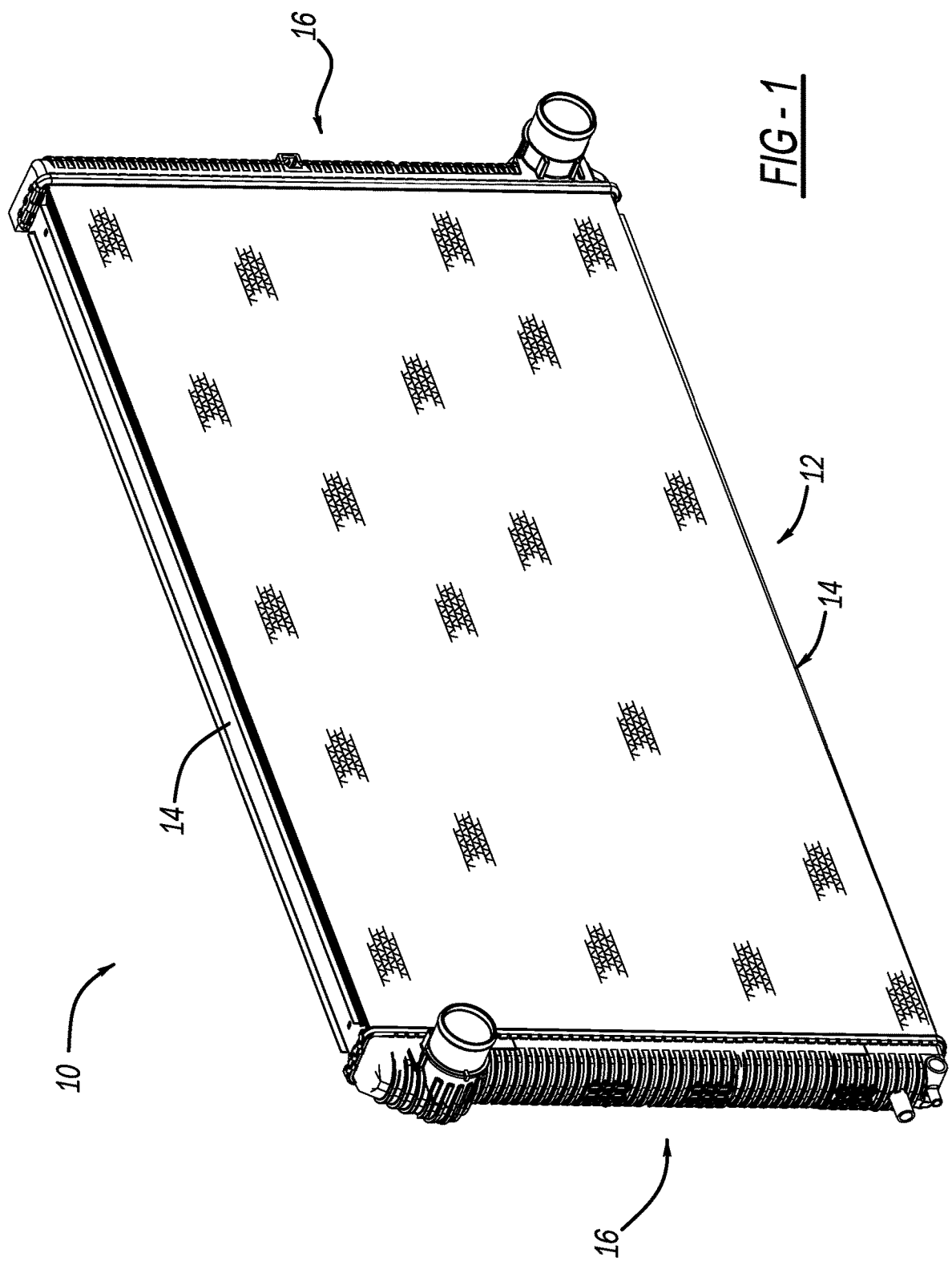
FIG. 1 is a perspective view of a heat exchanger.
Figure 2:
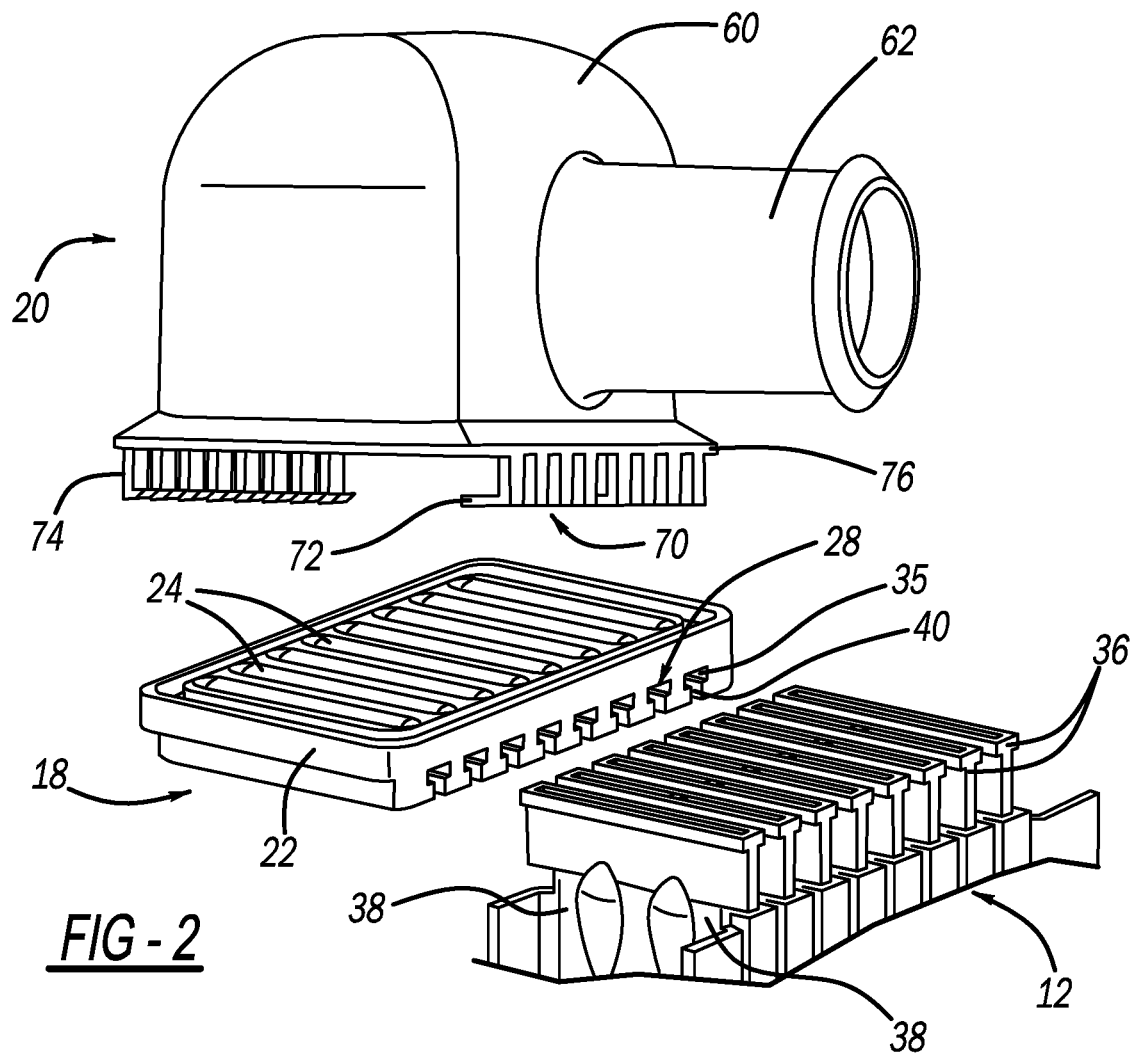
FIG. 2 is a partial exploded view of FIG. 1.
Figure 3:
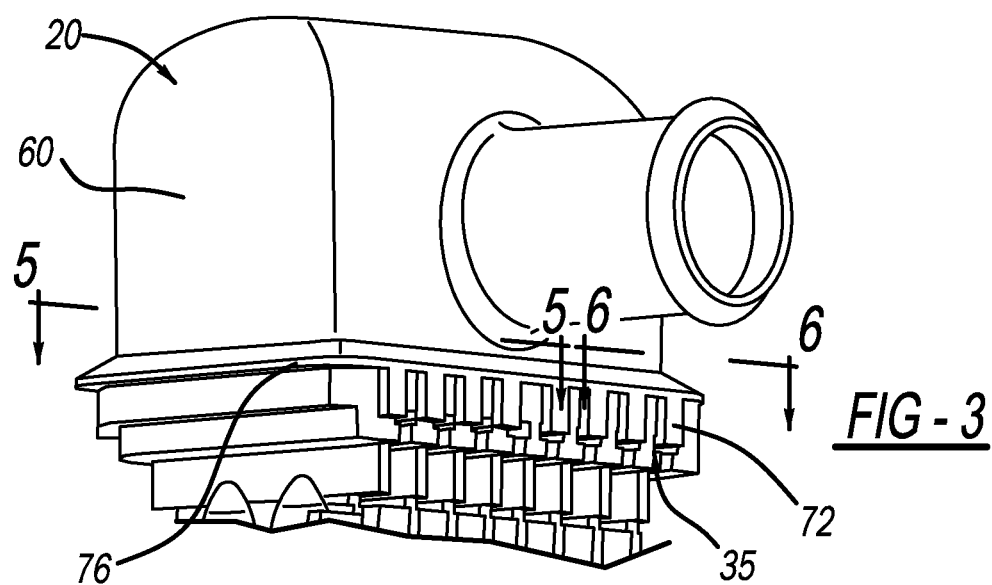
FIG. 3 is a partial perspective view of the assembled condition.

Example embodiments will now be described more fully with reference to the accompanying drawings.

Turning to the figures, a heat exchanger or radiator is illustrated and designated with the reference numeral 10. The heat exchanger/radiator 10 includes a heat exchanger core 12 with inserts 14 on each side of the core 12. A header part 16 is positioned at the ends of the core 12. The header part 16 includes a header plate 18 and tank 20.

The header plate 18 includes a body 22 having a plurality of apertures 24 passing through the body 22. The apertures 24 enable fluid from the tubes 12 to pass into the header tank 20.

The aperture includes a channel 26 that extends through the body 22. The channel 26 extends into a cutout portion 28. The cutout portion 28 includes walls 30, 32, 34 that define a rectangular slot 35. The rectangular slot 35 receives a collar 36 attached to the tubes 38 that extends from the exchanger core 12. A channel 40 extends from the rectangular slot. The channel 40 is defined by walls 42, 44 and extends through the body 22 to provide a passage all the way through the body. Also, the cutout portion 28 extends laterally across the entire body 22. Thus, the cutout extends from one side of the header plate 18 to the other. The bore 26, as well as the aperture 24, do not extend all the way across the body but yet extends into the cutout portion.

The header plate 18 is generally manufactured from a glass filled nylon material or its equivalents. The young's modulus of nylon is over 10 times lower than that of aluminum, so that during a thermal shock event, the tubes should have more thermal relief since the plastic header plate can flex more than an aluminum core plate. Thus, this lowers the stress in the tubes.

A seal 50 is provided in the cutout portion 28. The seal 50 generally is positioned on the walls 30, 32, 34, 42, 44 of the cutout portion 28. Thus, the collar 36 is sealed within the header plate 18 via the seal 50. The seal 50 is generally formed from an EPDM material. The EPDM material can be a liquid material or the like that is overmolded onto the header plate 18. Generally, the liquid EPDM material is added once the collars 36 have been inserted into the cutout portions 28 of the header plate 18.

The cutout portion 28 has an over T-shape when the header plate 18 is viewed in side elevation. This shape is complimentary with the collar 36 on a tube 38. The collar 36 includes a head 52 having an overall rectangular shape. A passage portion 54 extends from the head 52. The passage portion 54 is braised or the like with the tubes 38 of the core 12.

Figure 4:
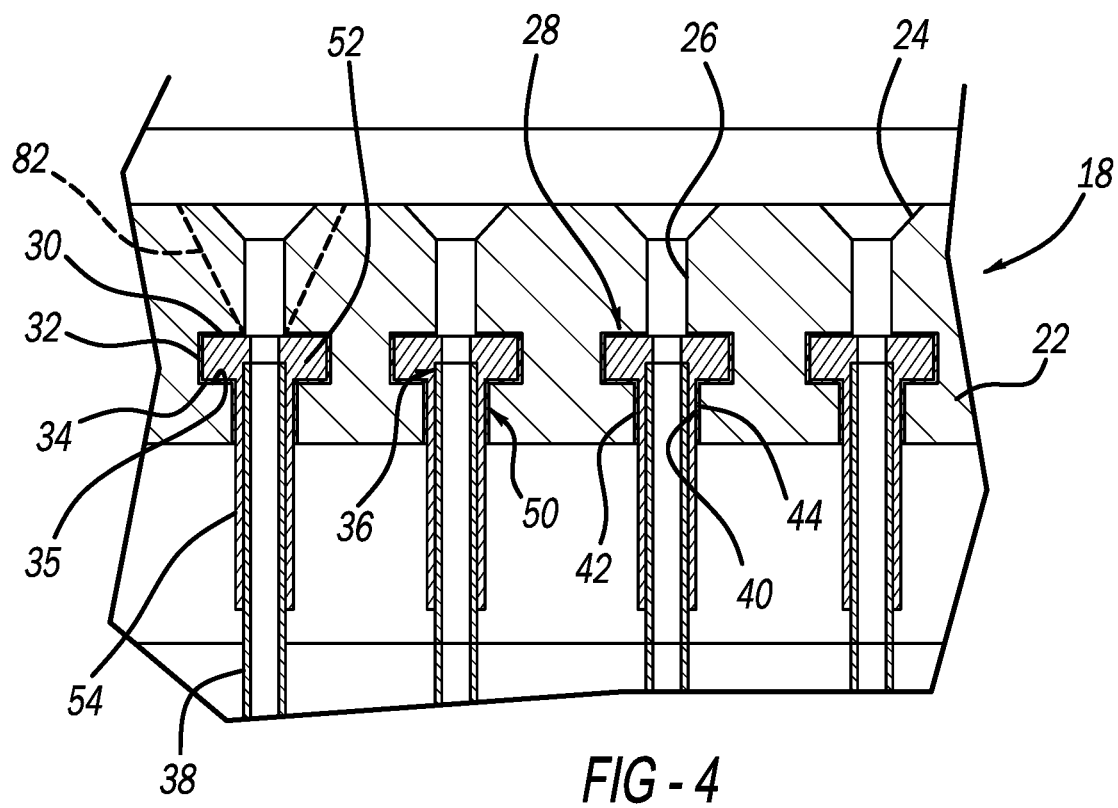
FIG. 4 is a cross-section view of FIG. 3.

Thus, once the collars 36 are positioned into the cutouts 28, the EPDM material is added. The EPDM material provides a seal as described above that surround the collar head 52 as well as a portion of the passage 54 as seen in FIG. 4. Thus, each collar 36 is individual sealed within the header plate 18.

The header tank 20 includes a body 60 that has an overall rectangular box shape. The body 60 is hollow and is of a conventional design. The body 60 also includes a spigot 62 that enables fluid to pass through the tank 20. The header tank 20 includes a latch mechanism 70 that secures the header tank 20 with the header plate 18. The latch 70 includes a plurality of hooks 72 and lugs 74. The hooks 72 are L-shape members extending from a flange 76 on the body 60. The L-shape hook 72 insert from the side of the header plate 18 into the slot 35 of the cutout portion 28. The header tank 20 is then pivoted about the header plate 18 so that the lugs 74 can secure on the other side of the header plate 18. The lugs include a tab 78 that secures under the flange on the other side of the header plate 18. Thus, the header tank 20 is snap-fit onto the header plate 18.

Figure 5:
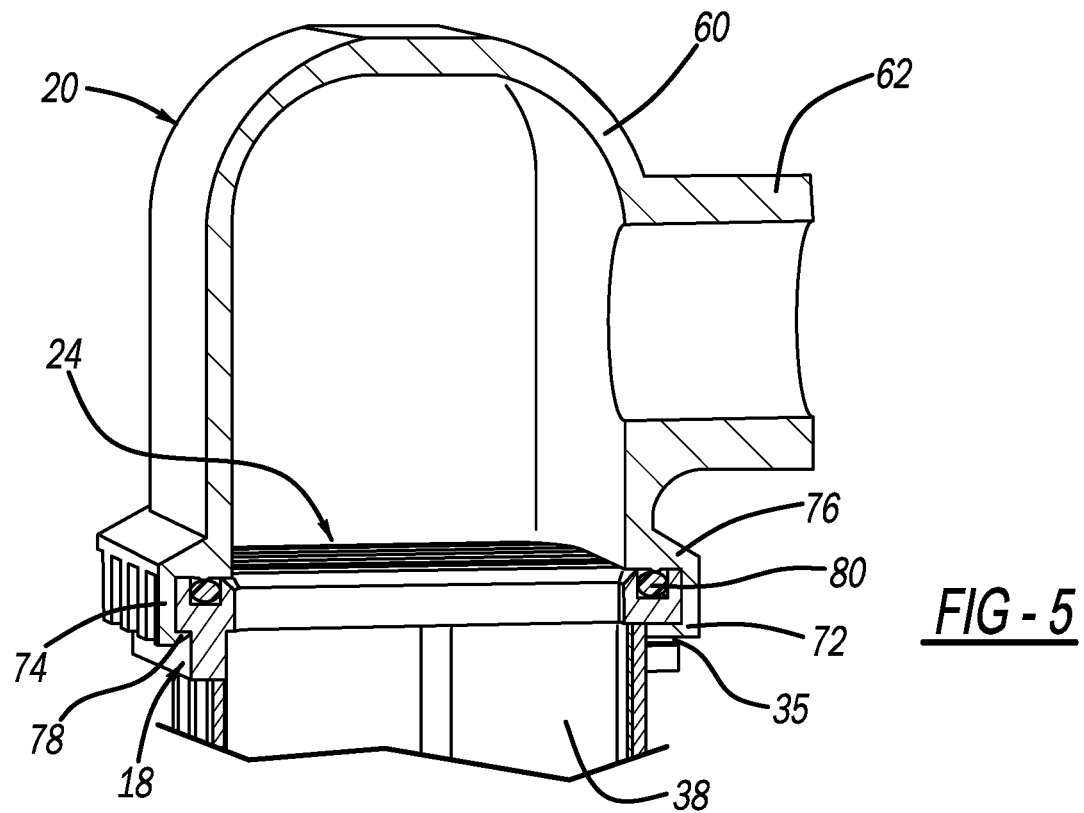
FIG. 5 is an additional cross-section view of FIG. 3 along line 5-5 thereof.

After this occurs, the header tank 20 can be welded with the header plate 18. Alternatively, the joint can be welded by a hot plate, vibration or ultrasonic welding. Additionally, a joint can be a tongue and groove butt joint or shear joint between the header plate 18 and the header tank 20. Further, a gasket 80 is positioned between the header plate 18 and header tank 20. The gasket 80 provides a peripheral seal between the header tank 20 via the header plate 18. This is best illustrated in FIG. 5.

Additionally, as illustrated in phantom in FIG. 4, a tube chamfer 82 can be opened up to reduce the water pressure drop. Thus, a larger opening to the tubes can be provided in the header plate 18.

Thus, as coolant in the core heats up and expands the tubes 38, the plastic header plate 18, being flexible, provides bending movement to accommodate for the expansion of the hot tubes. Additionally, the header plate 18 can flex to provide movement for the tubes that are in tension while not expanding the cold tubes. Thus, the header plate 18 provides a flexible header for the exchanger core 12 when it is heating up and has hot as well as cold tubes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automotive heat exchanger comprising:
    a heat exchanger core including a header part with a plurality of heat transfer tubes and a header tank with an opening for receiving end portions of the heat transfer tubes; and
    a plastic header plate secured with the header tank, the header plate including a plurality of apertures extending through the plate that enable fluid passage, each aperture including a cutout portion for receiving an end of a heat transfer tube, the cutout portion having a complimentary shape to mate with the end of the heat transfer tube, the cutout portion is a slot with an overall T-shape when viewed in side elevation and a seal in the cutout portion for individually sealing the end of each heat transfer tube with the header plate.

2. The automotive heat exchanger of claim 1, further comprising a plurality of collars on the ends of the plurality of heat transfer tubes, the collars each having a head with a desired configuration mating with the corresponding cutout portion.

3. The automotive heat exchanger of claim 2, wherein the head has an overall rectangular shape.

4. The automotive heat exchanger of claim 1, wherein the seal is on a wall of the header plate defining the T-shaped cutout.

5. The automotive heat exchanger of claim 1, wherein the seal is an EPDM material.

6. The automotive heat exchanger of claim 1, wherein the header tank further comprises a mechanism for coupling with the header plate, the coupling mechanism including a plurality of latches mating with the cutouts.

7. The automotive heat exchanger of claim 6, wherein the plurality of latches include a plurality of hooks and lugs.

8. An automotive heat exchanger comprising:
    a heat exchanger core including a header part with a plurality of heat transfer tubes and a header tank with an opening for receiving end portions of the heat transfer tubes; and
    a plastic header plate secured with the header tank, the header plate including a plurality of apertures extending through the plate that enable fluid passage, each aperture including a cutout portion for receiving an end of a heat transfer tube, the cutout portion having a complimentary shape to mate with the end of the heat transfer tube, and a seal in the cutout portion for individually sealing the end of each heat transfer tube with the header plate;
    the header tank further comprises a mechanism for coupling with the header plate, the coupling mechanism including a plurality of latches mating with the cutouts.

9. The automotive heat exchanger of claim 8, wherein the plurality of latches include a plurality of hooks and lugs.

* * * * *